United States Patent
Soloway et al.

(10) Patent No.: US 12,349,177 B2
(45) Date of Patent: *Jul. 1, 2025

(54) ALLOCATING RESOURCES TO A PLURALITY OF MOBILE DEVICES

(71) Applicant: QUALCOMM Incorporated, San Diego, CA (US)

(72) Inventors: Alan Soloway, Frederick, CO (US); Edward Robert Hall, Bristol (GB); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 18/332,736

(22) Filed: Jun. 11, 2023

(65) Prior Publication Data

US 2023/0389060 A1    Nov. 30, 2023

Related U.S. Application Data

(63) Continuation of application No. 17/079,426, filed on Oct. 24, 2020, now Pat. No. 11,716,749.

(Continued)

(51) Int. Cl.
*H04W 72/54* (2023.01)

(52) U.S. Cl.
CPC .................. *H04W 72/54* (2023.01)

(58) Field of Classification Search
CPC ........... H04W 74/0833; H04W 52/346; H04W 52/44; H04W 52/48; H04W 72/54;

(Continued)

(56) References Cited

U.S. PATENT DOCUMENTS

| 2006/0203758 A1* | 9/2006 | Tee ........................ H04W 88/04 709/227 |
| 2008/0282252 A1* | 11/2008 | Prasanna ................... G06F 9/52 718/104 |

(Continued)

FOREIGN PATENT DOCUMENTS

| CN | 104472002 A | 3/2015 |
| CN | 104472004 A | 3/2015 |

OTHER PUBLICATIONS

International Search Report and Written Opinion—PCT/US2020/057464—ISA/EPO—Dec. 15, 2020. 16 pages.

(Continued)

*Primary Examiner* — Nizam U Ahmed
(74) *Attorney, Agent, or Firm* — QUALCOMM IP DEPT.; James Hunt Yancey, Jr.

(57) ABSTRACT

Embodiments include methods performed by a processor of a mobile device for allocating resources to a plurality of mobile devices in communication with an Edge network. The processor may receive from the plurality of mobile devices one or more capabilities of each mobile device related to a computing task in which the plurality of mobile devices are participating. The processor may determine a fairness result for the plurality of computing devices based on the one or more capabilities of each mobile device and the computing task. The processor may allocate resources to each of the plurality of mobile devices based on the determined fairness result.

26 Claims, 12 Drawing Sheets

Related U.S. Application Data

(60) Provisional application No. 62/931,284, filed on Nov. 6, 2019.

(58) Field of Classification Search
CPC ... H04W 72/53; H04B 1/0458; H04B 7/0404; H04B 7/0602; H04B 1/0466; H04B 1/0483; H04B 17/102; H04B 17/14; H04B 17/11; H04L 5/0053; H04L 5/0037; G06F 9/5044
See application file for complete search history.

(56) References Cited

U.S. PATENT DOCUMENTS

| | | |
|---|---|---|
| 2019/0045356 A1 | 2/2019 | Akhavain Mohammadi |
| 2019/0158606 A1 | 5/2019 | Guim Bernat et al. |
| 2021/0136775 A1 | 5/2021 | Soloway et al. |

OTHER PUBLICATIONS

Meskar E., et al., "Fair Multi-Resource Allocation With External Resource for Mobile Edge Computing", IEEE INFOCOM 2018—IEEE Conference on Computer Communications Workshops (Infocom Wkshps), IEEE, Apr. 15, 2018 (Apr. 15, 2018), pp. 184-189, XP033372962, DOI: 10.1109/ INFCOMW.2018.8406965 [retrieved on Jul. 6, 2018], figures 1, 2, sections I-V.

Zhou J., et al., "Joint Resource Allocation and User Association for Heterogeneous Services in Multi-Access Edge Computing Networks", IEEE Access, vol. 7, Jan. 11, 2019 (Jan. 11, 2019), pp. 12272-12282, XP011708411, DOI: 10.1109/ACCESS.2019.2892466 [retrieved on Feb. 4, 2019], figures 1-7, sections I-VI.

Zhu Z., et al., "Fair Resource Allocation for System Throughput Maximization in Mobile Edge Computing", IEEE Access, vol. 6, Jan. 8, 2018 (Jan. 8, 2018 ), pp. 5332-5340, XP055756654, USA ISSN: 2169-3536, DOI: 10.1109/Access. 2018.2790963, figures 1-5, sections I-V.

Lin F., et al., "Fair Resource Allocation in an Intrusion-Detection System for Edge Computing: Ensuring the Security of Internet of Things Devices", IEEE Consumer Electronics Magazine, IEEE, Piscataway, NJ, USA, vol. 7, No. 6, Nov. 1, 2018, XP011690967, pp. 45-50.

Meskar E., et al., "Fair Multi-Resource Allocation With External Resource for Mobile Edge Computing", IEEE INFOCOM 2018—IEEE Conference on Computer Communications Workshops (Infocom Wkshps), IEEE, Apr. 15, 2018 (Apr. 15, 2018), XP033372962, pp. 184-189.

Zhou J., et al., "Joint Resource Allocation and User Association for Heterogeneous Services in Multi-Access Edge Computing Networks", IEEE Access, vol. 7, Jan. 11, 2019 (Jan. 11, 2019), XP011708411, pp. 12272-12282.

Zhu Z., et al., "Fair Resource Allocation for System Throughput Maximization in Mobile Edge Computing", IEEE Access, vol. 6, Jan. 8, 2018 (Jan. 8, 2018 ), XP055756654, pp. 5332-5340.

\* cited by examiner

ALLOCATING RESOURCES TO A PLURALITY OF MOBILE DEVICES

RELATED APPLICATIONS

This application is a continuation application of U.S. Non-Provisional patent application Ser. No. 17/079,426 entitled "Allocating Resources To A Plurality Of Mobile Devices" filed Oct. 24, 2020, and claims priority to U.S. Provisional Patent Application No. 62/931,284 entitled "Allocating Resources To A Plurality Of Mobile Devices" filed Nov. 6, 2019, the entire contents of all of which are hereby incorporated by reference for all purposes.

BACKGROUND

Edge computing is a distributed computing paradigm that provides network computing devices with data storage positioned closer in the network to user equipment such as mobile devices. Edge computing can supplement computing capabilities of mobile device with the computing and data storage capabilities of Edge computing devices. Being positioned within the network close to mobile devices, Edge computing systems may improve response times and save communication bandwidth as compared to more conventional cloud-based architectures in which cloud processing is performed at more distant network locations, which introduces communication delays and increases latency.

In certain situations, multiple endpoint devices, such as mobile devices, may be required to provide substantially the same level of performance or output. For example, an electronic sports event requires that all participating computing devices provide substantially the same level of game performance, video output, and sound output. As another example, automobiles traveling together (e.g., platooning) performed more safely when the vehicles interoperate at the same level of performance.

SUMMARY

Various aspects include methods performed by a processor of a computing device for allocating resources to a plurality of mobile devices in communication with an Edge network. Various aspects may include receiving from the plurality of mobile devices one or more capabilities of each mobile device related to a computing task in which the plurality of mobile devices are participating, determining a fairness result for the plurality of computing devices based on the one or more capabilities of each mobile device and the computing task, and allocating resources to each of the plurality of mobile devices based on the determined fairness result.

In some aspects, determining the fairness result may include determining an allocation of network or Edge resources that provides a substantially similar performance of the computing task for each of the plurality of mobile devices. Some aspects may include determining a lowest common performance threshold based on the one or more capabilities of each of the plurality of mobile devices and the computing task. In some aspects, determining the fairness result for the plurality of computing devices based on the one or more capabilities of each of the plurality of mobile devices and the computing task may include determining the fairness result for the plurality of computing devices based on the lowest common performance threshold.

Some aspects may include determining a highest common performance threshold based on the one or more capabilities of the plurality of mobile devices and the computing task. In some aspects, determining the fairness result for the plurality of computing devices based on the one or more capabilities of each of the plurality of mobile devices and the computing task may include determining the fairness result for the plurality of computing devices based on the highest common performance threshold.

In some aspects, allocating resources to each of the plurality of mobile devices based on the determined fairness result may include allocating Edge computing device resources to perform at least a part of the computing task to one of the plurality of mobile devices based on the determined fairness result. In some aspects, allocating resources to each of the plurality of mobile devices based on the determined fairness result may include sending to each of the plurality of mobile devices an output instruction such that each of the plurality of computing devices presents a substantially similar output of the computing task. In some aspects, allocating resources to each of the plurality of mobile devices based on the determined fairness result may include allocating to each of the plurality of mobile devices a communication link, wherein each communication link is configured in a manner consistent with the fairness result. In some aspects, allocating resources to each of the plurality of mobile devices based on the determined fairness result may include allocating resources to a communication link between two Edge networks to provide to each mobile device a communication link that is configured in a manner consistent with the fairness result. In some aspects, allocating resources to each of the plurality of mobile devices based on the determined fairness result may include excluding a mobile device from the plurality of mobile devices based on the determined fairness result.

Further aspects may include a computing device having a processor configured to perform one or more operations of the methods summarized above. Further aspects may include a non-transitory processor-readable storage medium having stored thereon processor-executable instructions configured to cause a processor of a computing device to perform operations of the methods summarized above. Further aspects include a computing device having means for performing functions of the methods summarized above. Further aspects include a system on chip for use in a computing device that includes a processor configured to perform one or more operations of the methods summarized above. Further aspects include a system in a package that includes two systems on chip for use in a computing device that includes a processor configured to perform one or more operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
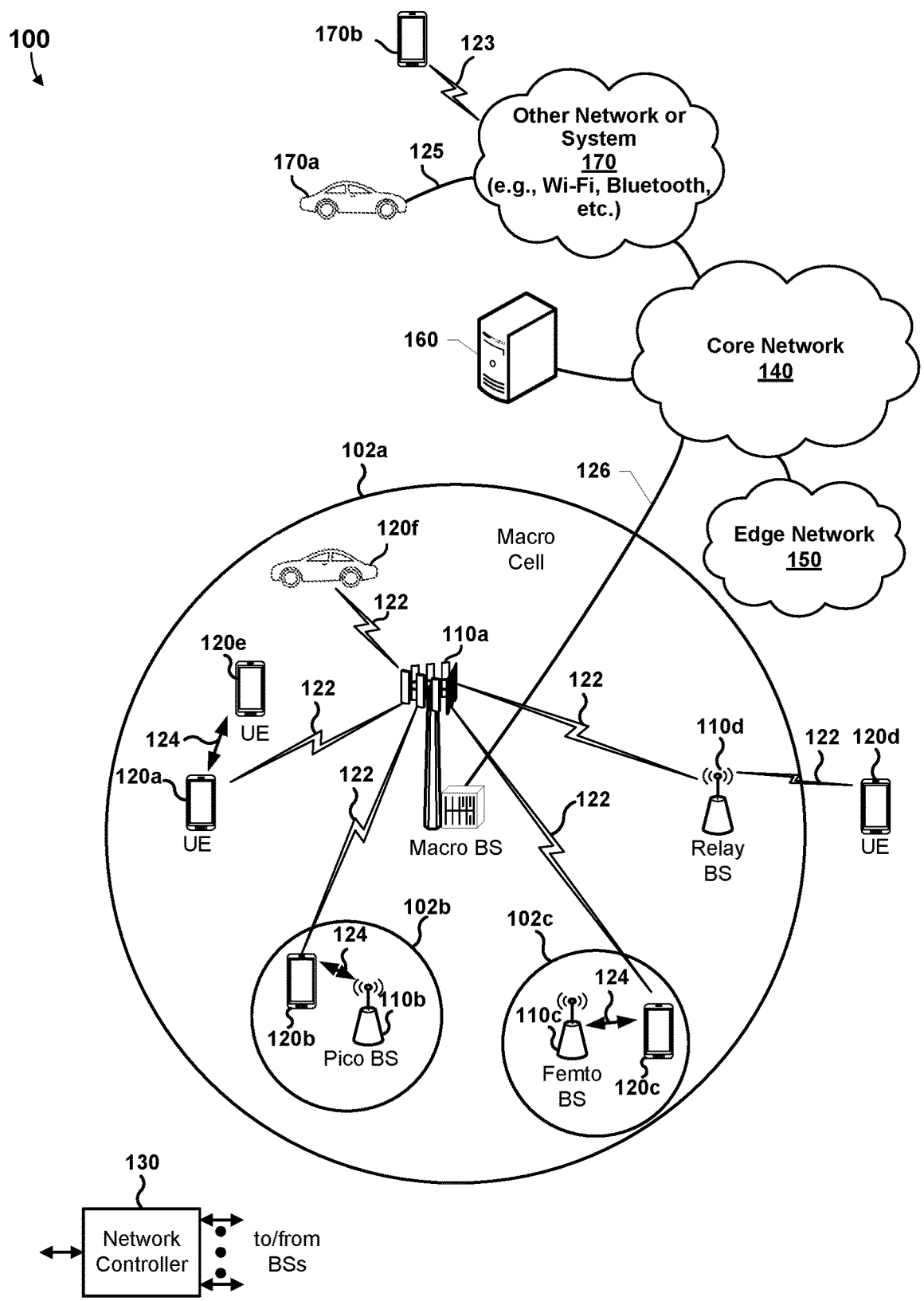
FIG. 1 is a system block diagram illustrating an example communications system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "mobile device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, wireless router devices, wireless appliances, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, mobile devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

In some cases, multiple networked endpoint devices may be required to provide substantially the same level of performance or output. For example, eSports events require that all participating computing devices provide substantially the same level of game performance, video output, and sound output. As another example, automobiles traveling together (e.g., platooning) perform more safely when the vehicles interoperate at the same level of performance, such as similar performance of maneuvering functions, path planning functions, mapping functions, safety sensors, and other features. As another example, a set of Internet of things (IoT) devices may require the same level of ability to interact for each individual IoT device.

Various embodiments provide methods and computing devices configured to negotiate and manage the allocation of computing resources, communication link resources, and other resources to each of a plurality of mobile devices such that each of the mobile devices provides a substantially equivalent level of interactivity, level of performance, outcome, or result (termed "fairness" herein).

In various embodiments, a network computing device may receive messages reporting capabilities of each of a plurality of mobile devices that are participating in a computing task. In some embodiments, the computing device may receive one or more messages from an Edge network computing device that is in communication with or manages one or more mobile devices. For example, a message from a mobile device may report one or more observed or observable communication link characteristics, such as latency, jitter, uplink and/or downlink bandwidth, modulation and coding scheme, available bandwidth, bit rate, network congestion, communication link utilization level, channel quality, signal strength, bit error rate, packet loss rate, priority level, quality of service (QoS)(e.g., a QoS promise or commitment from the network), and the like, including combinations thereof. As another example, a message from a mobile device may report one or more of the mobile device's processor power, a computing load of one or more mobile device processors, an availability of mobile device storage and/or volatile memory, battery charge state, a power dissipation of the mobile device, internal device quality of service capabilities, display processing and output capabilities, audio processing and output capabilities, and the like, including combinations thereof. In some embodiments, an Edge computing device in an Edge data network may detect capabilities of one or more mobile devices and may report the detected capabilities of the one or more mobile devices to the computing device.

The computing task may include a variety of activities in which the plurality of mobile devices may participate. For example, the computing task may include a video game being played at each of the plurality mobile devices. The computing task may include, for example, a plurality of vehicles traveling together in relatively close proximity, such as a group of platooning vehicles. The computing task may include, for example, a real-time betting or wagering service, such as may be hosted at a sports venue. The computing task may include, for example, a video conference or multimedia conference service. Other examples of the computing task are also possible.

In various embodiments, the computing device may determine a fairness result for the plurality of mobile devices based on the one or more capabilities of each mobile device and the computing task. In some embodiments, the computing device may evaluate the one or more capabilities of each mobile device related to the computing task and may determine common capabilities of the plurality of mobile devices based on the messages or reports from the plurality mobile devices. In some embodiments, determining the fairness result may include determining allocation of network resources were Edge network resources that provides a substantially similar performance of the computing task for each of the mobile devices.

In some embodiments, the computing device may determine a lowest common performance threshold based on the one or more capabilities of each of the plurality of mobile devices and the computing task. For example, the computing device may determine a common performance threshold representing a baseline of performance to be provided for each of the plurality of mobile devices. In some embodiments, the computing device may determine the fairness result for the plurality of mobile devices based on the lowest common performance threshold. In some embodiments, the computing device may determine a highest common performance threshold based on the one or more capabilities of each of the plurality of mobile devices and the computing task. For example, the computing device may determine a common performance threshold representing a high end or level of performance to be provided by each of the plurality of mobile devices, or a high end or level of performance that is achievable by the plurality of mobile devices. In some embodiments, the computing device may determine the fairness result for the plurality of mobile devices based on the lowest common performance threshold. In some embodiments, the computing device may determine the fairness result for the plurality of mobile devices based on the lowest common performance threshold and the highest common performance threshold, such that the mobile devices are provided a baseline of performance (according to the lowest common performance threshold) that also includes headroom (according to the highest common performance threshold) to accommodate or adjust to variations in network conditions, as well as to ensure that substantially the same communication link result is provided to each of the plurality of mobile devices.

In various embodiments, the computing device may allocate resources to each of the plurality of mobile devices based on the determined fairness result. In some embodiments, the computing device may allocate Edge computing device resources to perform at least a part of the computing task to one of the plurality of mobile devices based on the determined fairness result. For example, a mobile device that is unable to meet the lowest common performance threshold by itself may be allocated Edge computing device resources by the computing device in order to boost the performance of the mobile device to meet the lowest common performance threshold.

In some embodiments, the computing device may send to each of the plurality of mobile devices and output instruction such that each of the plurality of mobile devices presents a substantially similar output of the computing task. For example, the output instruction may provide a command or instruction to each of the plurality of mobile devices to output a display at a substantially similar frame rendering rate, or to output sound at a substantially similar audio quality, such that even though certain individual mobile devices may be capable of outputting a higher frame rate or greater audio quality, each of the plurality of mobile devices presents a substantially similar output. As another example, the output instruction may provide a command or instruction to each of a plurality of platooning vehicles to operate a safety function at an equally high level of performance, to increase the safety provided by the safety function for all of the platooning vehicles.

In some embodiments, the computing device may allocate to each of the plurality of mobile devices a communication link configured in a manner consistent with the fairness result. For example, the computing device may allocate to each of the plurality of mobile devices a different quality service, bandwidth, modulation and coding scheme, or another communication link parameter or aspect, to provide to each of the plurality of mobile devices a communication link that provides a substantially similar resulting communication link for each of the plurality mobile devices. In some embodiments, the computing device may allocate resources to a communication link between two Edge networks in a manner consistent with the fairness result, to provide to each of the plurality of mobile devices a communication link that provides a substantially similar resulting communication link for each of the plurality mobile devices.

In some embodiments, the computing device may exclude a mobile device from the plurality of mobile devices based on the determined fairness result. In some embodiments, the computing device may exclude or drop a mobile device from participating in the computing task based on the determined fairness result. For example, in response to determining that capabilities of a mobile device have decreased below a threshold, the computing device may exclude that mobile device from the plurality mobile devices.

Various embodiments enable the computing device to dynamically receive information about various network and communication device capabilities and to dynamically adjust resource allocation to each participating mobile device to maintain fairness for each participating mobile device. As capabilities of the network, communication links, and/or computing devices change, the computing device may update the fairness result according to the changed conditions. In some embodiments, the computing device may adjust one or more thresholds based on the changed conditions, such as increasing a lowest common performance threshold, or decreasing a highest common performance threshold, such that each mobile device provides a substantially similar level of performance, output, etc. for the computing task in which the plurality of mobile devices are participating. In this way, the computing device determines the fairness result based on the computing task as well as the one or more capabilities of each mobile device.

Various embodiments may be implemented in a variety of scenarios. For example, in a competitive computer gaming environment, such as eSports or a video gaming tournament, each player device must deliver substantially the same level of performance. In this scenario, the computing device may evaluate capabilities of each player device and may provide a fair performance outcome for each player device. In some cases, the computing device may allocate Edge network computing resources to boost performance of a player device to meet a minimum performance threshold. In some cases, the computing device may determine the fairness result for the plurality of mobile devices based on the lowest common performance threshold and the highest common performance threshold. For example, each participating device may be granted a baseline of performance (based on the lowest common performance threshold), but no participating device would be granted resources that convey an unfair advantage (based on the highest common performance threshold). Using a highest common performance threshold may also ensure that sufficient resources remain available to accommodate or adjust to variations in capabilities and conditions, including network conditions.

As another example, vehicles traveling together (e.g., platooning) may provide greater safety when each of the vehicles meets a substantially similar safety margin of performance. In this scenario, the computing device may evaluate capabilities of each vehicle for communication, maneuvering, location awareness, map rendering, sensor performance, etc. to provide a consistent level of group behavior of each of the vehicles.

As another example, a group of mobile devices may participate in a real-time interactive service, such as an electronic betting or electronic wagering service. In this scenario, the computing device may evaluate capabilities of each of the mobile devices participating in the interactive service, including aspects of a communication link available to each of the mobile devices, as well as the device capabilities of each of the mobile devices. In some embodiments, the computing device may determine a minimum level of performance to provide to all of the participating mobile devices. In some embodiments, the computing device may exclude or drop a mobile device from participating in the computing task. For example, in response to determining that capabilities of a mobile device have decreased below a threshold, the computing device may exclude that mobile device from the plurality mobile devices. For example, a mobile device participating in the real-time interactive service may experience a decrease in its capabilities (e.g., because a user is leaving the sporting venue). In some embodiments, the computing device may drop that mobile device or exclude that mobile device from further participating in the computing task.

Various embodiments may improve the operation of mobile devices by enabling the computing device to make dynamic decisions to allocate resources to each mobile device in a manner that provides a fairness of outcome or result for each mobile device. Various embodiments may improve the operation of mobile devices by enabling the computing device to make dynamic decisions to allocate resources to each mobile device in a manner that provides a fairness of performance or output related to a computing task for each mobile device.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a variety of mobile devices (illustrated as mobile devices 120a-120f, 170a, 170b in FIG. 1) and a core network 140 that includes one or more network elements 160. The communications system 100 may include an Edge network 150 (e.g., an Edge data network) configured to provide network computing resources in proximity to the mobile devices. The communications system 100 may include one or more other networks or systems 170, such as a Wi-Fi system, a Bluetooth system, and/or the like, that may provide access to the core network 140 to the one or more mobile devices 170a, 170b via a wired communication link 125 or a wireless communication link 123. The communications system 100 may also include a number of base stations (illustrated as the BS 110a, the BS 110b, the BS 110c, and the BS 110d) and other network entities. A base station is an entity that communicates with mobile devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The mobile device 120a-120f may communicate with the base station 110a-110d over a wireless communication link 122.

The wired communication links 125 and 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a mobile device or a base station). A relay station also may be a mobile device that can relay transmissions for other mobile devices. In the example illustrated in FIG. 1, a relay station 110d may communicate with macro the base station 110a and the mobile device 120d in order to facilitate communication between the base station 110a and the mobile device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The mobile devices 120a, 120b, 120c may be dispersed throughout communications system 100, and each mobile device may be stationary or mobile. A mobile device also may be referred to as an access terminal, a terminal, a mobile station, a subscriber unit, a station, etc.

A macro base station 110a may communicate with the communication network 140 over a wired or wireless communication link 126. The mobile devices 120a, 120b, 120c may communicate with a base station 110a-110d over a wireless communication link 122.

The wireless communication links 122, 123, and 124 may include a plurality of carrier signals, frequencies, or frequency bands, each of which may include a plurality of logical channels. The wireless communication links 122, 123, and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 123, and 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per mobile device. Multi-layer transmissions with up to 2 streams per mobile device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A mobile device 120a-e may be included inside a housing that houses components of the mobile device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
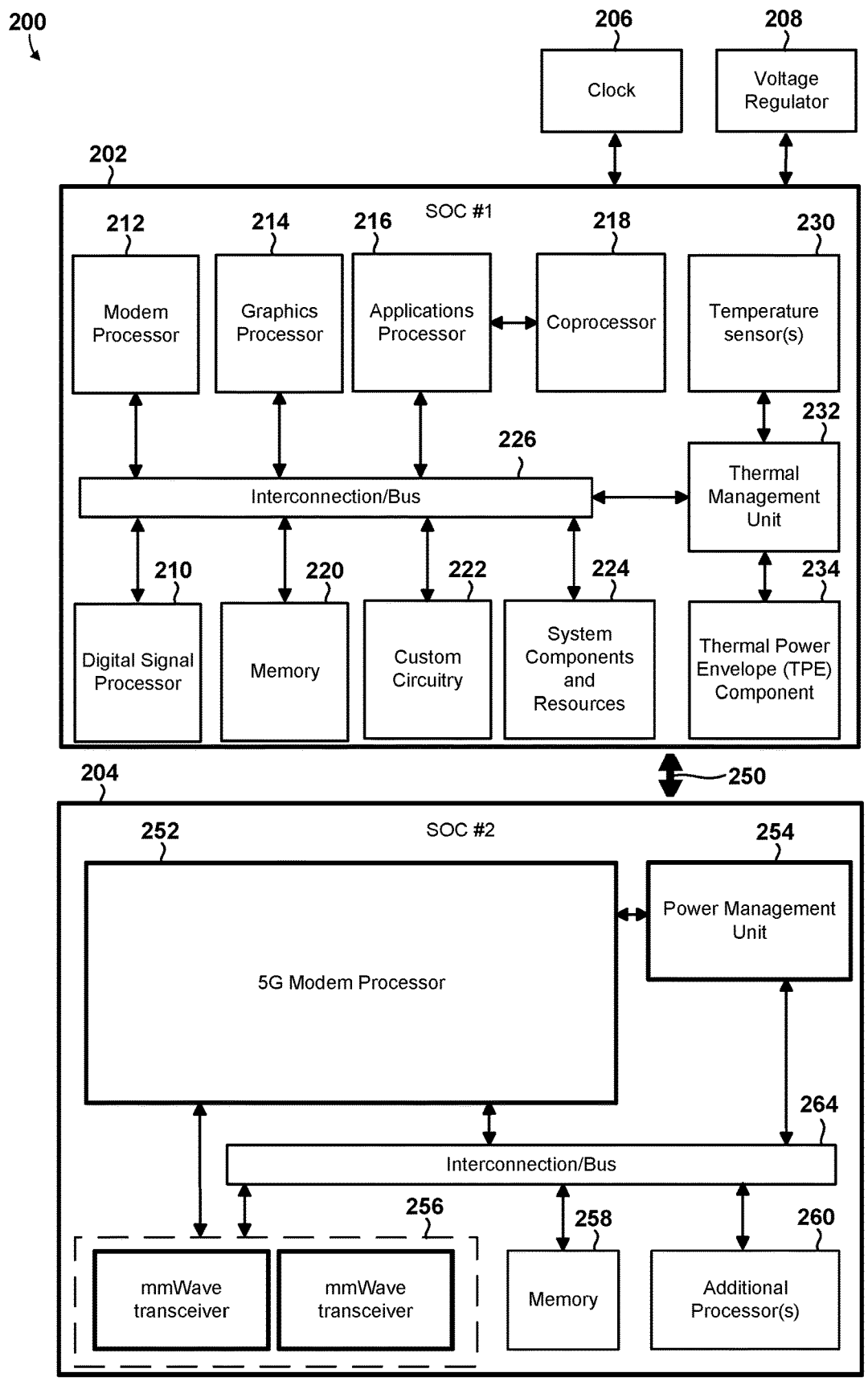
FIG. 2 is a component block diagram illustrating a computing system suitable for use with various embodiments.

In some implementations, two or more mobile devices 120a-e (for example, illustrated as the mobile device 120a and the mobile device 120e) may communicate directly using one or more sidelink channels 124 (for example, without using a base station 110a-110d as an intermediary to communicate with one another). For example, the mobile devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the mobile device 120a-e may perform scheduling operations, resource selection operations, as well as other operations described elsewhere herein as being performed by the base station 110a Various embodiments may be implemented on a number of single processor and multiprocessor computer systems, including a system-on-chip (SOC) or system in a package (SIP). FIG. 2 illustrates an example computing system or SIP 200 architecture that may be used in mobile devices implementing the various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the mobile device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a mobile device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
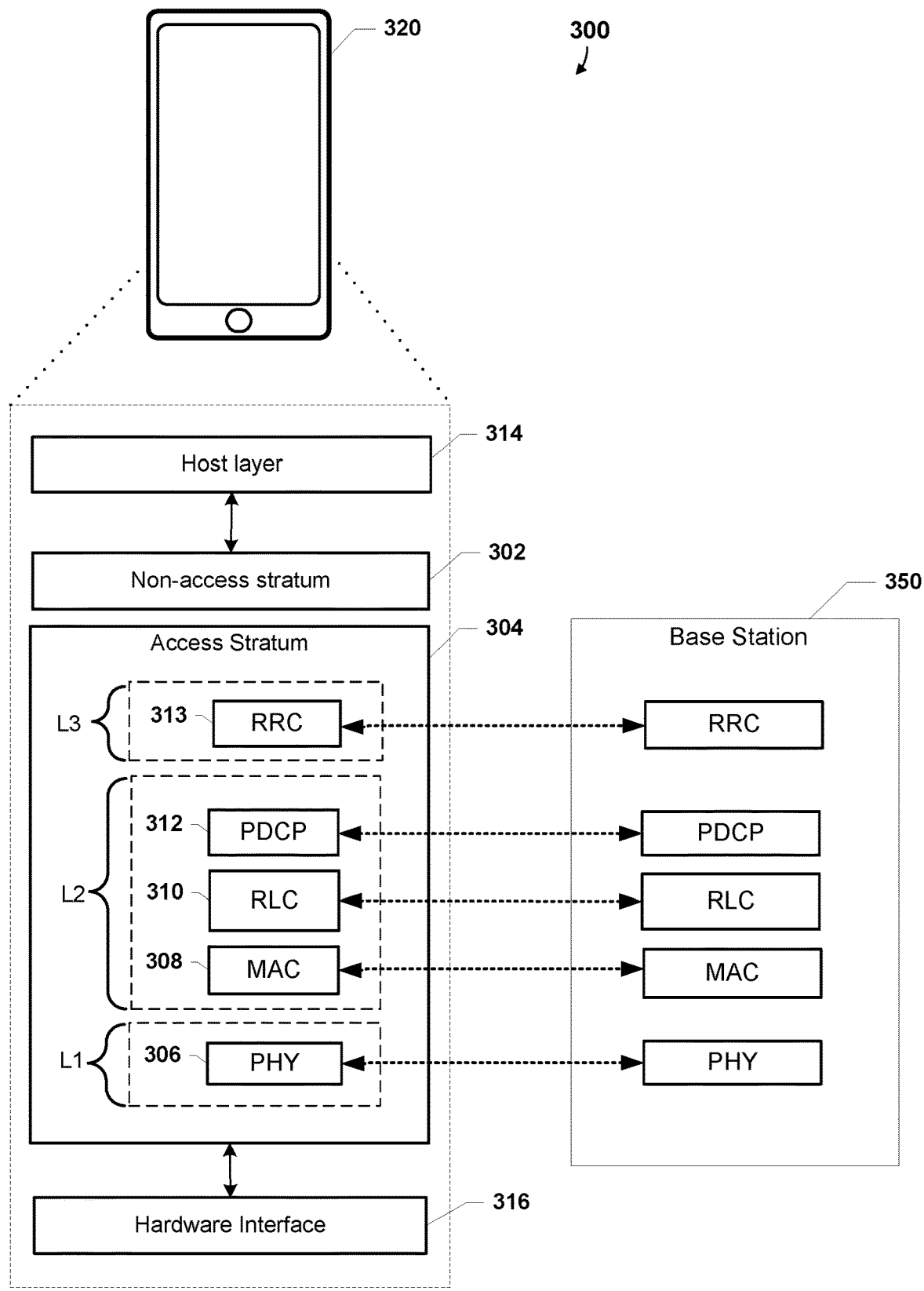
FIG. 3 is a diagram illustrating an example of a software architecture including a radio protocol stack for the user and control planes in wireless communications suitable for use with various embodiments.

FIG. 3 illustrates an example of a software architecture 300 including a radio protocol stack for the user and control planes in wireless communications between a base station 350 (e.g., the base station 110a) and a mobile device 320 (e.g., the mobile device 120a-120f, 170a, 170b, 200). With reference to FIGS. 1-3, the mobile device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) mobile device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the mobile device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the mobile device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the mobile device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the mobile device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
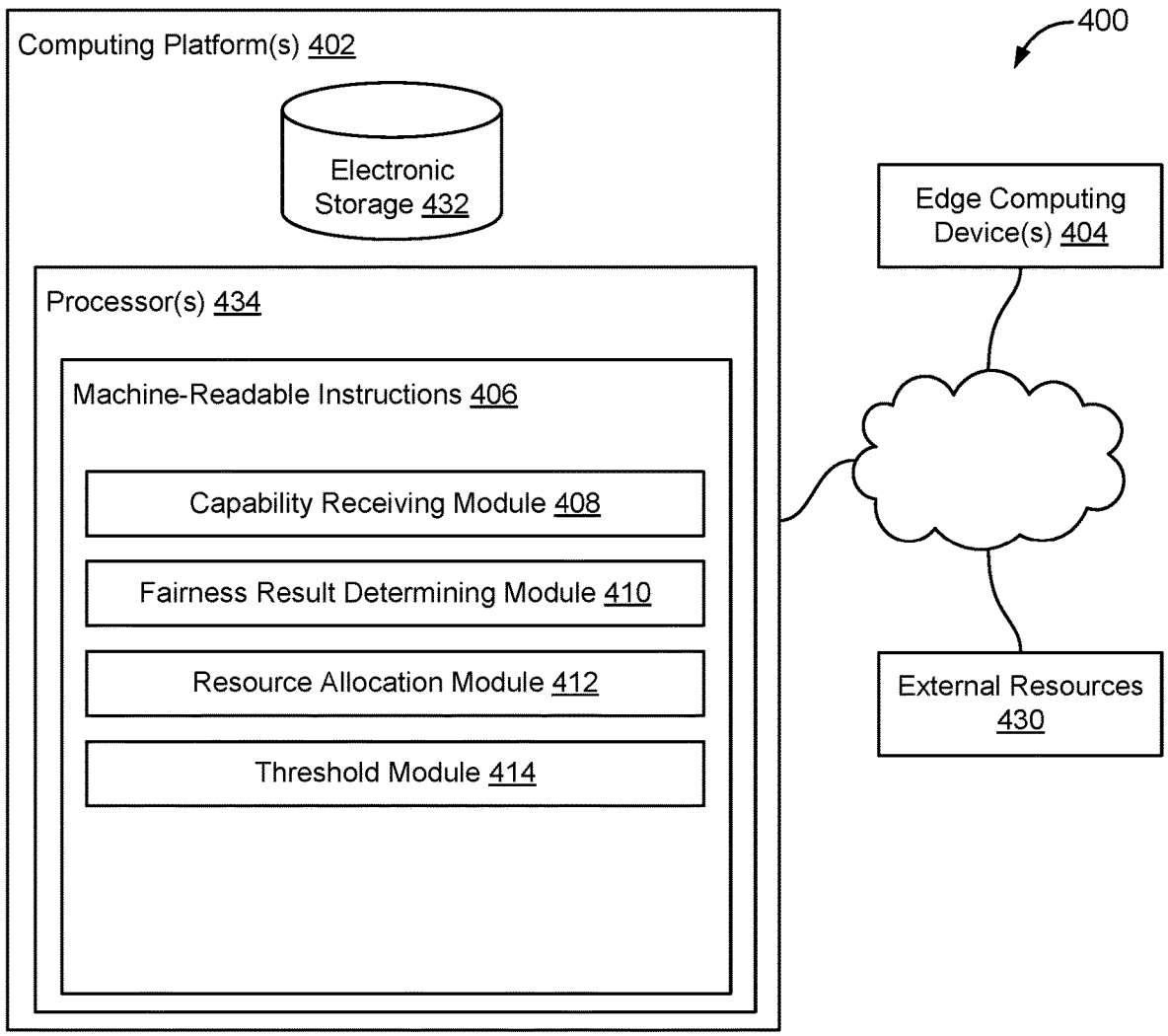
FIG. 4 is a component block diagram illustrating a system configured to allocate a computing task between a mobile device and an Edge computing device in accordance with various embodiments.

FIG. 4 is a component block diagram illustrating a system 400 configured performed by a processor of a mobile device for allocating a computing task between the mobile device and an Edge computing device in accordance with various embodiments. In some embodiments, system 400 may include one or more computing platforms 402 and/or one or more edge computing devices 404. With reference to FIGS. 1-4, mobile device(s) 402 may include a base station (e.g., the base station 110a-110d, 350) and/or a mobile device (e.g., the mobile device 120a-120f, 170a, 170b, 200, 320). Remote platform(s) 404 may include a base station (e.g., the base station 110*a*-110*d*, 350) and/or a mobile device (e.g., the mobile device 120*a*-120*f*, 170*a*, 170*b*, 200, 320).

Mobile device(s) 402 may be configured by machine-readable instructions 406. Machine-readable instructions 406 may include one or more instruction modules. The instruction modules may include computer program modules. The instruction modules may include one or more of a capability receiving module 408, a fairness result determining module 410, a resource allocation module 412, and a threshold module 414.

The capability receiving module 408 may be configured to receive from a plurality of mobile devices one or more capabilities of each mobile device related to a computing task in which the plurality of mobile devices are participating.

The fairness result determining module 410 may be configured to determine a fairness result for the plurality of computing devices based on the one or more capabilities of each mobile device and the computing task. In some embodiments, the fairness result determining module 410 may be configured to determine an allocation of network or Edge resources that provides a substantially similar performance of the computing task for each of the plurality of mobile devices.

The resource allocation module 412 may be configured to allocate resources to each of the plurality of mobile devices based on the determined fairness result. In some embodiments, the resource allocation module 412 may be configured to allocate Edge computing device resources to perform at least a part of the computing task to one of the plurality of mobile devices based on the determined fairness result. In some embodiments, the resource allocation module 412 may be configured to send to each of the plurality of mobile devices an output instruction such that each of the plurality of computing devices presents a substantially similar output of the computing task. In some embodiments, the resource allocation module 412 may be configured to allocate to each of the plurality of mobile devices a communication link each configured in a manner consistent with the fairness result. In some embodiments, the resource allocation module 412 may be configured to allocate resources to a communication link between two Edge networks to provide to each mobile device a communication link that is configured in a manner consistent with the fairness result. In some embodiments, the resource allocation module 412 may be configured to exclude a mobile device from the plurality of mobile devices based on the determined fairness result.

The threshold module 414 may be configured to determine one or more thresholds based on the one or more capabilities of each of the plurality of mobile devices and the computing task. In some embodiments, the threshold module 414 may be configured to determine a lowest common performance threshold based on the one or more capabilities of each of the plurality of mobile devices and the computing task. In some embodiments, the threshold module 414 may be configured to determine a highest common performance threshold based on the one or more capabilities of each of the plurality of mobile devices and the computing task.

The threshold module 416 may be configured to determine, for one or more of a plurality of mobile device processing capability factors, a respective threshold based on a plurality of computing task factors. The threshold module 416 may be configured to determine, for one or more of a plurality of Edge computing device processing capability factors, a respective threshold based on the plurality of computing task factors. Further, the threshold module 416 may be configured to determine whether one or more mobile device processing capability factors exceeds its respective threshold, and/or whether the one or more Edge computing device processing capability factors exceeds its respective threshold.

The operations that may be performed by the instruction modules 408-414 are further described below.

Figure 5:
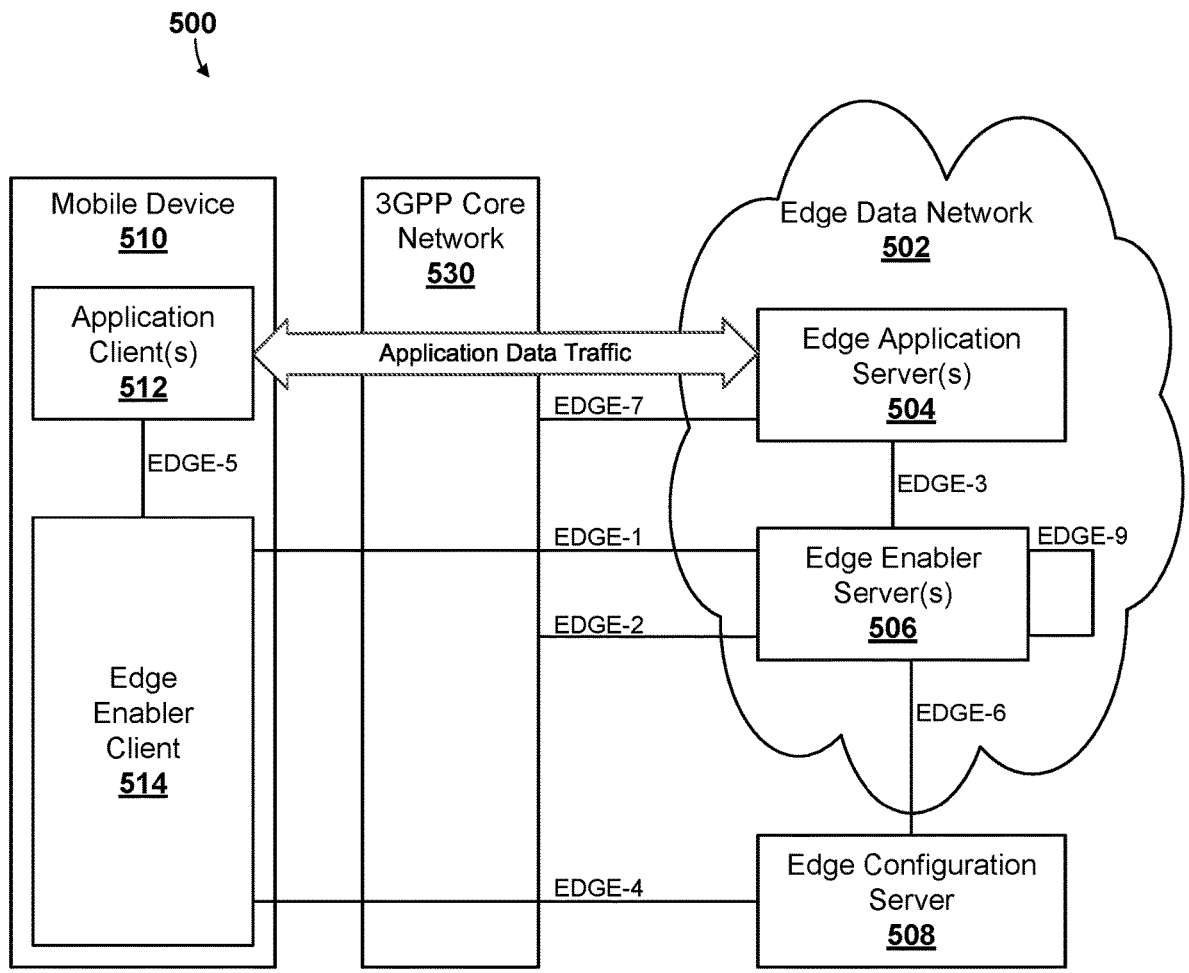
FIG. 5 is a system block diagram illustrating an example Edge computing system suitable for use with various embodiments.

FIG. 5 is a system block diagram illustrating an example Edge computing system 500 suitable for use with various embodiments. In some embodiments, Edge computing system 500 may include an Edge network 502 and a mobile device 510 configured to communicate via a 3GPP core network 530. The Edge data network 502 may include an Edge application server 502 and an Edge enabler server(s) 506, in communication with an Edge configuration server 508. The mobile device 510 may include an application client(s) 512 in communication with one or more Edge enabler client(s) 512. Each of the elements of the Edge computing system 500 may communicate over an Edge interface (e.g., EDGE-1, EDGE-2, . . . EDGE-9).

The Edge application server 504 and the application client(s) 512 each may be configured to process computing tasks, and may communicate application data traffic (i.e., data related to a computing task) via the 3GPP core network 530. The Edge enabler server(s) 506 may be configured to maintain and advertise (e.g., to devices such as the mobile device 510) applications provided by the Edge application server(s) 504. The Edge configuration server 508 may be configured to manage communication within and among one or more Edge data networks 502.

The Edge application server(s) 504 may provide information about its applications and their capabilities to the Edge enabler server(s) 506 via the EDGE-3 interface. The Edge enabler server(s) 506 may provide information about the Edge data network 502 to the Edge configuration server 508 via the EDGE-6 interface. The Edge application server(s) 504 and the Edge enabler server(s) 506 may communicate with the 3GPP core network 530 via the EDGE-7 interface and the EDGE-2 interface, respectively.

In some embodiments, the Edge enabler client(s) 514 may obtain information about the available Edge data networks 502 from the Edge configuration server 508 via the EDGE-1 interface. In some embodiments, the Edge enabler client(s) 514 may obtain information about Edge application server(s) 504 such as available applications and their capabilities via the EDGE-4 interface. In some embodiments, the Edge enabler client 514, the Edge enabler server(s) 506, and the Edge configuration server 508 may employ a discovery and provisioning procedure via their respective Edge interfaces.

The application client 512 may communicate with the Edge enabler client(s) 514 via the EDGE-5 interface. In some embodiments, the Edge enabler client(s) 514 may obtain information about available Edge data networks 502 from the Edge configuration server 508 via the EDGE-4 interface, and may coordinate the use of the Edge application server(s) 504 with the Edge enabler server(s) 506 via the EDGE-1 interface. Edge enabler servers 506 may coordinate with one another via the EDGE-9 interface.

Figure 6:
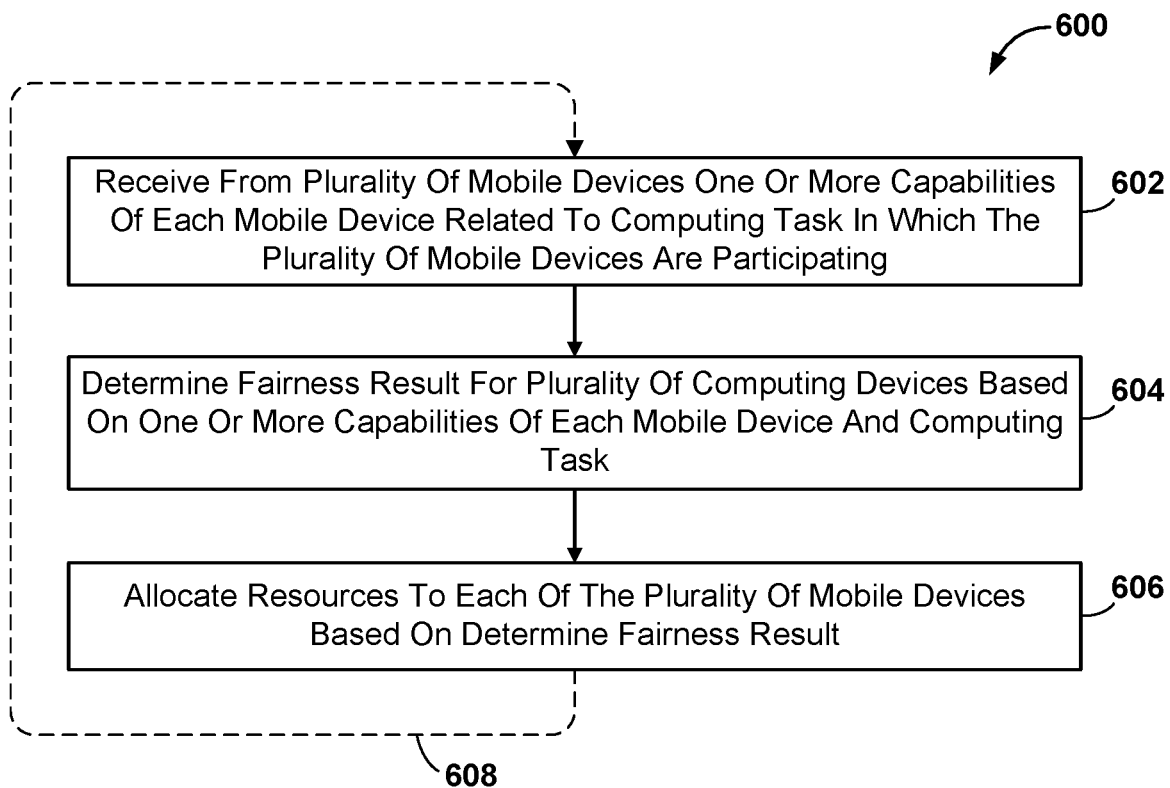
FIG. 6 is a process flow diagram illustrating operations of a method performed by a processor of a network computing device for allocating resources to a plurality of mobile devices in communication with an Edge network in accordance with various embodiments.

FIG. 6 is a process flow diagram illustrating operations of a method 600 performed by a processor of a computing device for allocating resources to a plurality of mobile devices in communication with an Edge network in accordance with various embodiments. With reference to FIGS. 1-6, the operations of the method 600 may be performed by a processor of a mobile device (e.g., the mobile device 120*a*-120*f*, 170*a*, 170*b*, 200, 320).

In block 602, the processor may receive from the plurality of mobile devices one or more capabilities of each mobile device related to a computing task in which the plurality of mobile device or participating. For example, the processor may receive a message from each of a plurality of mobile devices that are participating in a computing task that reports the capabilities of each mobile device. In some embodiments, an Edge computing device in an Edge data network may detect capabilities of one or more mobile devices and may report the detected capabilities of the one or more mobile devices to the computing device.

In block 604, the processor may determine a fairness result for the plurality of computing devices based on the one or more capabilities of each mobile device and the computing task. In some embodiments, determining the fairness result may include determining an allocation of network resources or Edge network resources that provides a substantially similar performance of the computing task for each of the mobile devices.

In block 606, the processor may allocate resources to each of the plurality of mobile devices based on the determined fairness result. In some embodiments, the processor may allocate resources to each of the plurality of mobile devices such that each of the mobile devices provides a substantially equivalent level of interactivity and/or level of performance of the computing task.

In optional operation 608, the processor may repeat the operations of blocks 602, 606, and 608 to evaluate reallocating resources to each of the plurality of mobile devices based upon changing parameters in the computing task, the mobile devices, the communication links, etc. In some embodiments, the mobile device may determine on an ongoing or iterative basis whether to allocate resources to each of the plurality of mobile devices.

Figure 7:
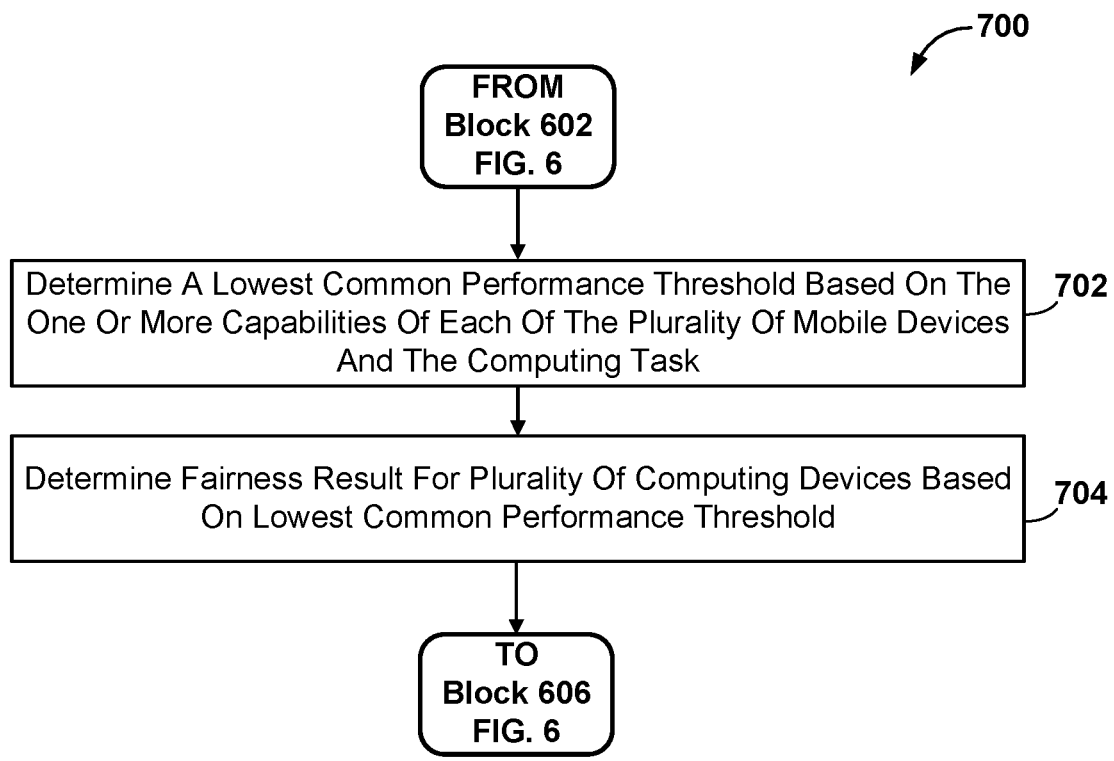
FIG. 7 is a process flow diagram illustrating operations of a method performed by a processor of a network computing device for allocating resources to a plurality of mobile devices in communication with an Edge network in accordance with various embodiments.

FIG. 7 is a process flow diagram illustrating operations of a method 700 performed by a processor of a computing device for allocating resources to a plurality of mobile devices in communication with an Edge network in accordance with various embodiments. With reference to FIGS. 1-7, the operations of the method 700 may be performed by a processor of a mobile device (e.g., the mobile device 120a-120f, 170a, 170b, 200, 320).

Following the performance of the operations of block 602 of the method 600 as described (FIG. 6), the processor may determine a lowest common performance threshold based on the one or more capabilities of each of the plurality of mobile devices and the computing task. For example, the computing device may determine a common performance threshold representing a baseline of performance to be provided for each of the plurality of mobile devices in block 702.

In block 704, the computing device may determine the fairness result for the plurality of mobile devices based on the lowest common performance threshold.

The processor may proceed to perform the operations of block 606 of the method 600 as described (FIG. 6).

Figure 8:
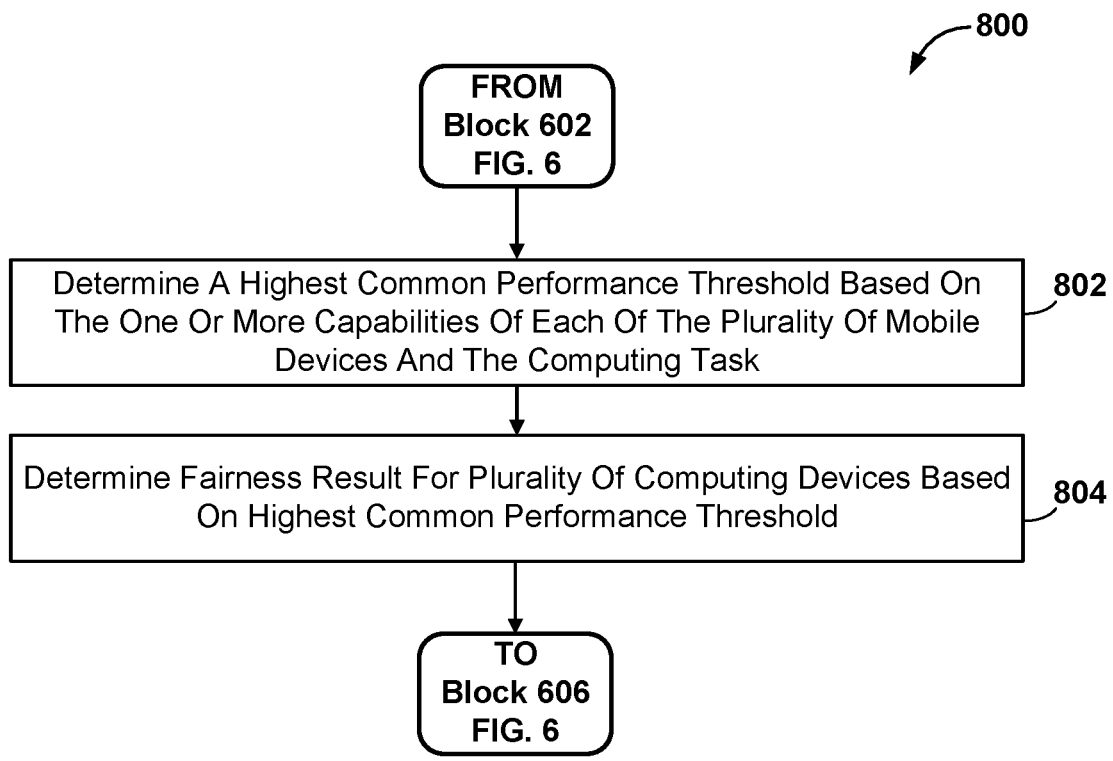
FIG. 8 is a process flow diagram illustrating operations that may be performed by a processor of a network computing device for allocating resources to a plurality of mobile devices in communication with an Edge network in accordance with various embodiments.

FIG. 8 is a process flow diagram illustrating operations of a method 800 performed by a processor of a computing device for allocating resources to a plurality of mobile devices in communication with an Edge network in accordance with various embodiments. With reference to FIGS. 1-8, the operations of the method 800 may be performed by a processor of a mobile device (e.g., the mobile device 120a-120f, 170a, 170b, 200, 320).

Following the performance of the operations of block 602 of the method 600 as described (FIG. 6), the processor may determine a highest common performance threshold based on the one or more capabilities of each of the plurality of mobile devices and the computing task in block 802. For example, the computing device may determine a common performance threshold representing a high end of performance to be provided for each of the plurality of mobile devices, or a high end of performance that is achievable by one or more of the plurality of mobile devices.

In block 804, the processor may determine the fairness result for the plurality of mobile devices based on the highest common performance threshold.

The processor may proceed to perform the operations of block 606 of the method 600 as described (FIG. 6).

Figure 9:
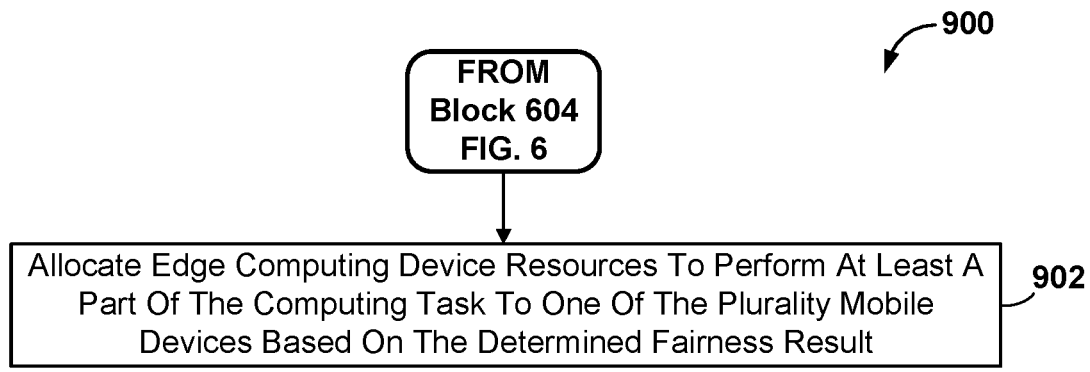
FIG. 9 is a process flow diagram illustrating operations that may be performed by a processor of a network computing device for allocating resources to a plurality of mobile devices in communication with an Edge network in accordance with various embodiments.

FIG. 9 is a process flow diagram illustrating operations of a method 900 performed by a processor of a computing device for allocating resources to a plurality of mobile devices in communication with an Edge network in accordance with various embodiments. With reference to FIGS. 1-9, the operations of the method 900 may be performed by a processor of a mobile device (e.g., the mobile device 120a-120f, 170a, 170b, 200, 320).

Following the performance of the operations of block 602 of the method 600 as described (FIG. 6), the processor may allocate Edge computing device resources to perform at least a part of the computing task to one of the plurality of mobile devices based on the determined fairness result in block 902.

In some embodiments, the processor may allocate to one of the plurality mobile devices one or more Edge computing device resources to perform at least a part of the computing task. For example, a mobile device may be unable to unable to meet a performance threshold by itself (e.g., a lowest common performance threshold). In some embodiments, the processor may allocate Edge computing device resources to the mobile device in order to boost the performance of the mobile device to meet the lowest common performance threshold.

Figure 10:
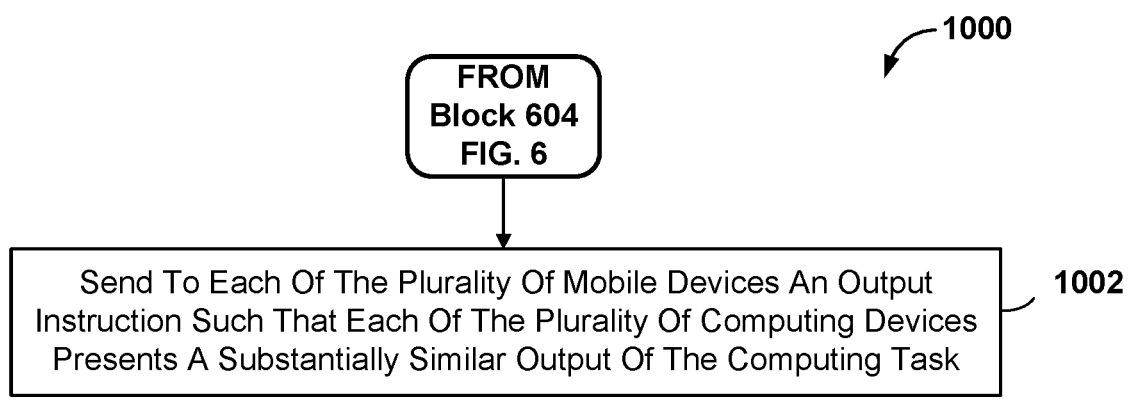
FIG. 10 is a process flow diagram illustrating operations that may be performed by a processor of a network computing device for allocating resources to a plurality of mobile devices in communication with an Edge network in accordance with various embodiments.

FIG. 10 is a process flow diagram illustrating operations of a method 1000 performed by a processor of a computing device for allocating resources to a plurality of mobile devices in communication with an Edge network in accordance with various embodiments. With reference to FIGS. 1-10, the operations of the method 1000 may be performed by a processor of a mobile device (e.g., the mobile device 170a, 170b, 200, 320).

Following the performance of the operations of block 602 of the method 600 as described (FIG. 6), the processor may send to each of the plurality of mobile devices an output instruction such that each of the plurality of computing devices presents a substantially similar output of the computing task in block 1002.

In some embodiments, the output instruction may provide a command or instruction to each of the plurality of mobile devices to output a display at a substantially similar frame rendering rate, or to output sound at a substantially similar audio quality, such that even though certain individual mobile devices may be capable of outputting a higher frame rate or greater audio quality, each of the plurality of mobile devices presents a substantially similar output. As another example, the output instruction may provide a command or instruction to each of a plurality of platooning vehicles to operate a safety function at an equally high level of performance, to increase the safety provided by the safety function for all of the platooning vehicles.

Figure 11:
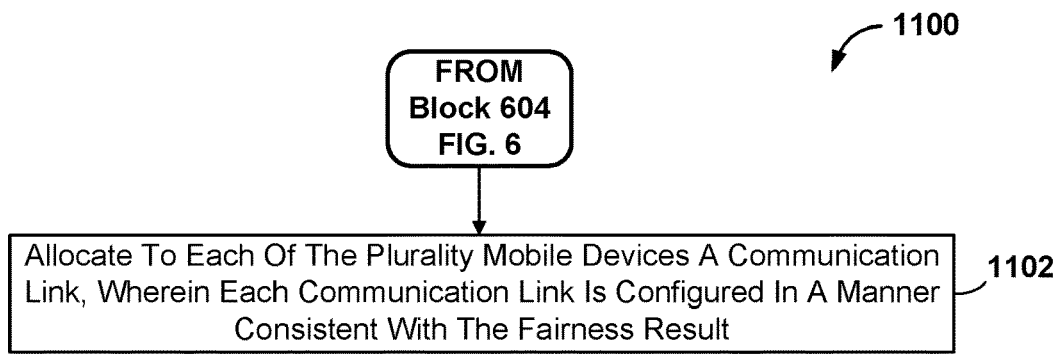
FIG. 11 is a process flow diagram illustrating operations that may be performed by a processor of a network computing device for allocating resources to a plurality of mobile devices in communication with an Edge network in accordance with various embodiments.

FIG. 11 is a process flow diagram illustrating operations of a method 1100 performed by a processor of a computing device for allocating resources to a plurality of mobile devices in communication with an Edge network in accordance with various embodiments. With reference to FIGS.

1-11, the operations of the method 1100 may be performed by a processor of a mobile device (e.g., the mobile device 120a-120f, 170a, 170b, 200, 320).

Following the performance of the operations of block 602 of the method 600 as described (FIG. 6), the processor may allocate to each of the plurality of mobile devices a communication link, wherein each communication link is configured in a manner consistent with the fairness result in block 1102. For example, the computing device may allocate to each of the plurality of mobile devices a different quality service, bandwidth, modulation and coding scheme, or another communication link parameter or aspect, to provide to each of the plurality of mobile devices a communication link that provides a substantially similar resulting communication link for each of the plurality mobile devices.

Figure 12:
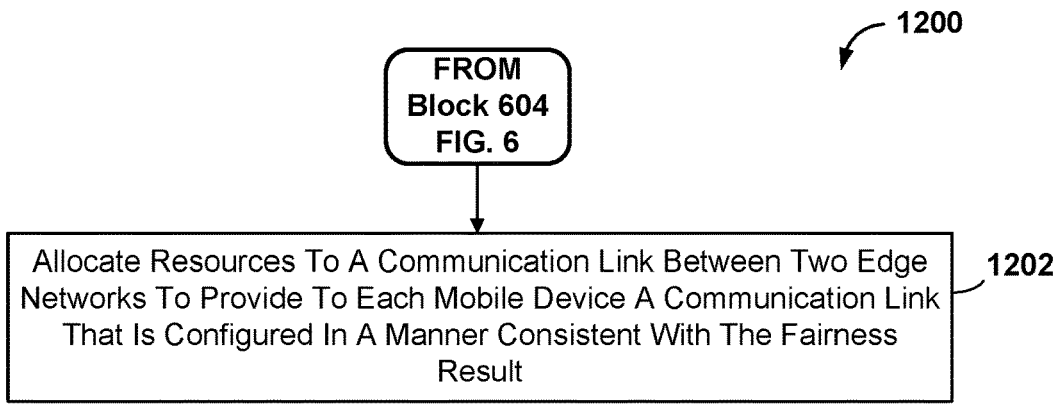
FIG. 12 is a process flow diagram illustrating operations that may be performed by a processor of a network computing device for allocating resources to a plurality of mobile devices in communication with an Edge network in accordance with various embodiments.

FIG. 12 is a process flow diagram illustrating operations of a method 1200 performed by a processor of a computing device for allocating resources to a plurality of mobile devices in communication with an Edge network in accordance with various embodiments. With reference to FIGS. 1-12, the operations of the method 1200 may be performed by a processor of a mobile device (e.g., the mobile device 120a-120f, 170a, 170b, 200, 320).

Following the performance of the operations of block 602 of the method 600 as described (FIG. 6), the processor may allocate resources to a communication link between two Edge networks to provide to each mobile device a communication link that is configured in a manner consistent with the fairness result in block 1202. In some embodiments, the computing device may allocate resources to a communication link between two Edge networks in a manner consistent with the fairness result, to provide to each of the plurality of mobile devices a communication link that provides a substantially similar resulting communication link for each of the plurality mobile devices.

Figure 13:
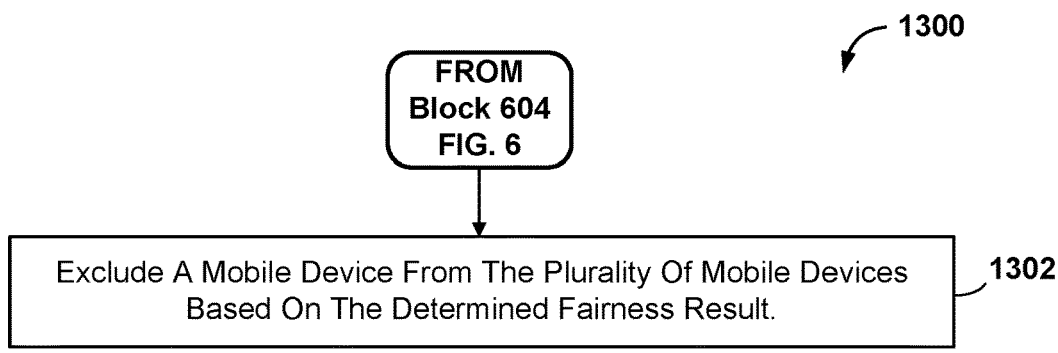
FIG. 13 is a process flow diagram illustrating operations that may be performed by a processor of a network computing device for allocating resources to a plurality of mobile devices in communication with an Edge network in accordance with various embodiments.

FIG. 13 is a process flow diagram illustrating operations of a method 1300 performed by a processor of a computing device for allocating resources to a plurality of mobile devices in communication with an Edge network in accordance with various embodiments. With reference to FIGS. 1-13, the operations of the method 1300 may be performed by a processor of a mobile device (e.g., the mobile device 120a-120f, 170a, 170b, 200, 320).

Following the performance of the operations of block 602 of the method 600 as described (FIG. 6), the processor may exclude a mobile device from the plurality of mobile devices based on the determined fairness result in block 1302. For example, in response to determining that capabilities of a mobile device have decreased below a threshold (e.g., a minimum performance threshold), the computing device may exclude that mobile device from the plurality mobile devices.

Figure 14:
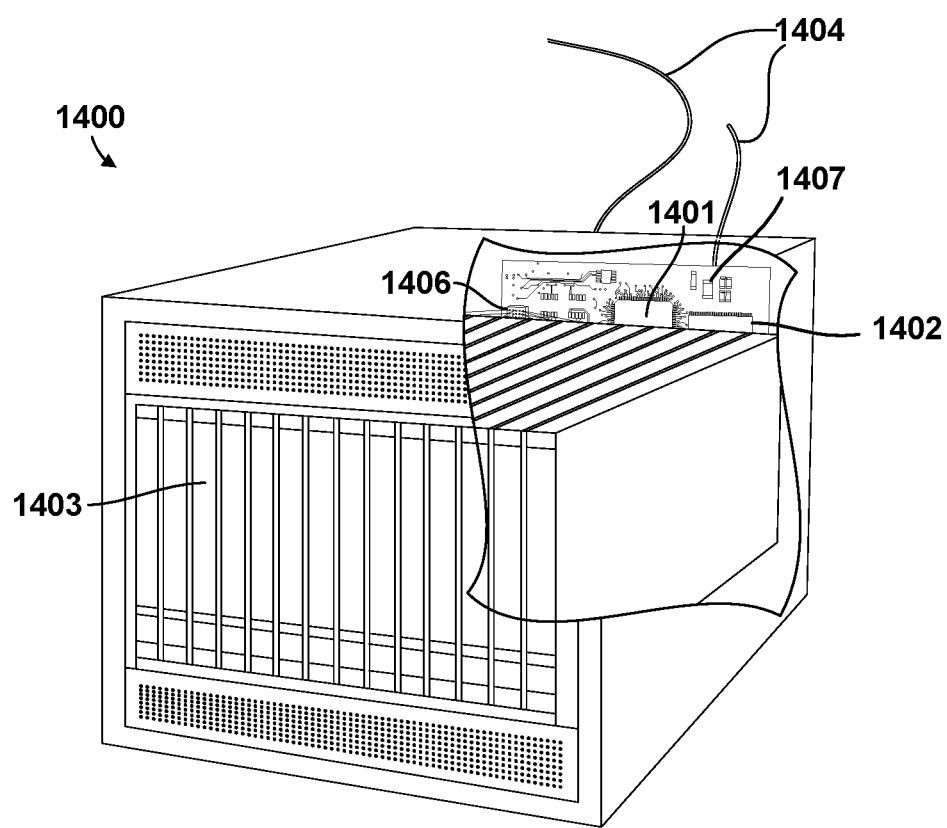
FIG. 14 is a component block diagram of a network computing device suitable for use with various embodiments.

Various embodiments may be implemented on a variety of network devices, an example of which is illustrated in FIG. 14 in the form of a network computing device 1400 functioning as a network element (e.g., 160) of a communication network, such as a network server, an Edge computing device, or another suitable network computing device. Such network computing devices may include at least the components illustrated in FIG. 14. With reference to FIGS. 1-14, the network computing device 1400 may typically include a processor 1401 coupled to volatile memory 1402 and a large capacity nonvolatile memory, such as a disk drive 1403. The network computing device 1400 may also include a peripheral memory access device such as a floppy disc drive, compact disc (CD) or digital video disc (DVD) drive 1406 coupled to the processor 1401. The network computing device 1400 may also include network access ports 1404 (or interfaces) coupled to the processor 1401 for establishing data connections with a network, such as the Internet and/or a local area network coupled to other system computers and servers. The network computing device 1400 may include one or more antennas 1407 for sending and receiving electromagnetic radiation that may be connected to a wireless communication link. The network computing device 1400 may include additional access ports, such as USB, Firewire, Thunderbolt, and the like for coupling to peripherals, external memory, or other devices.

Figure 15:
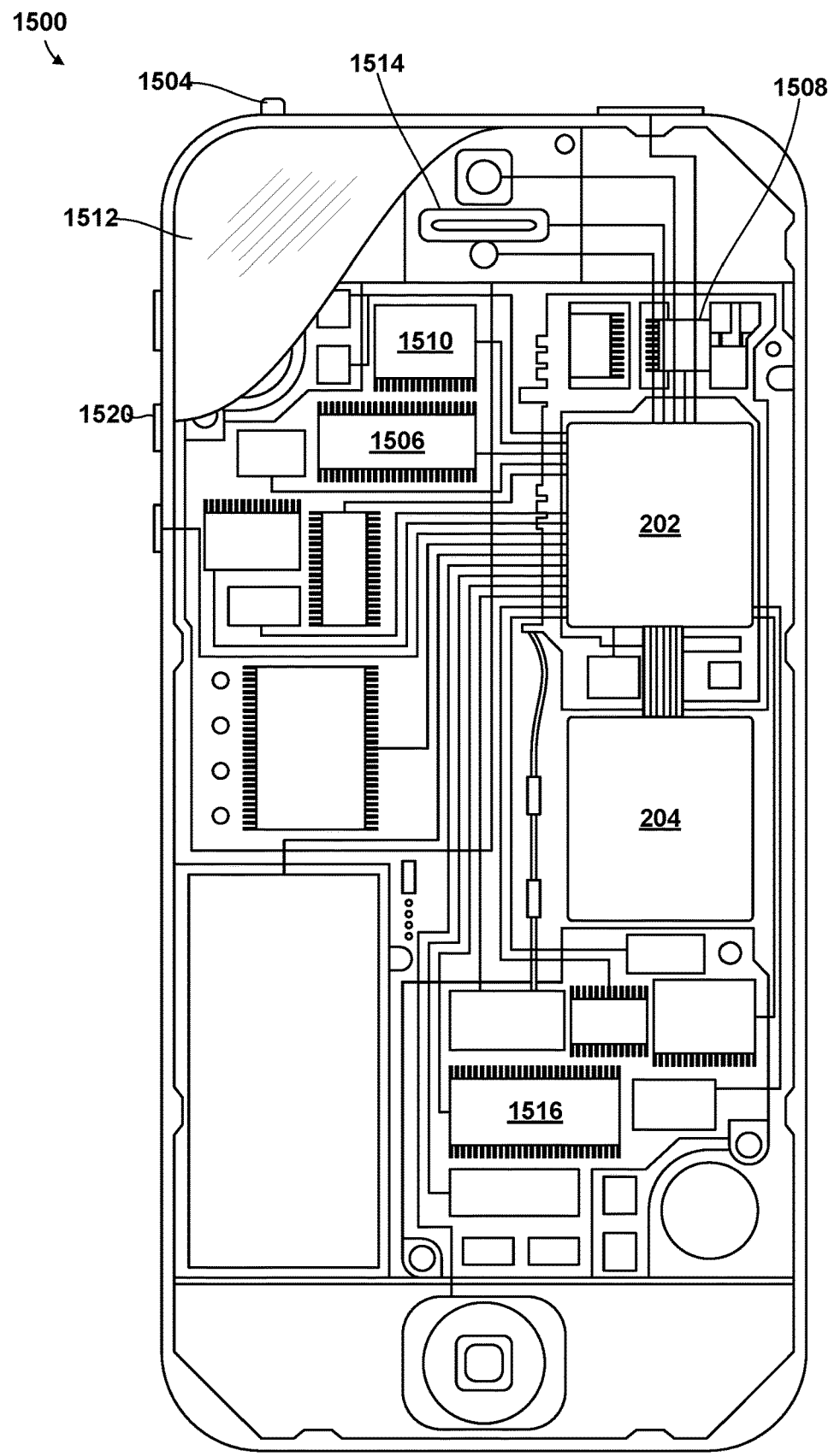
FIG. 15 is a component block diagram of a wireless communication device suitable for use with various embodiments.

Various embodiments may be implemented on a variety of mobile devices (e.g., the mobile device 120a-120f, 170a, 170b, 200, 320), an example of which is illustrated in FIG. 15 in the form of a smartphone 1500. The smartphone 1500 may include a first SOC 202 (e.g., a SOC-CPU) coupled to a second SOC 204 (e.g., a 5G capable SOC). The first and second SOCs 202, 204 may be coupled to internal memory 1506, 1516, a display 1512, and to a speaker 1514. Additionally, the smartphone 1500 may include an antenna 1504 for sending and receiving electromagnetic radiation that may be connected to a wireless data link and/or cellular telephone transceiver 1508 coupled to one or more processors in the first and/or second SOCs 202, 204. Smartphones 1500 typically also include menu selection buttons or rocker switches 1520 for receiving user inputs.

A typical smartphone 1500 also includes a sound encoding/decoding (CODEC) circuit 1510, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1508 and CODEC 1510 may include a digital signal processor (DSP) circuit (not shown separately).

The processors of the network computing device 1400 and the smart phone 1500 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 1506, 1516 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a mobile device and the mobile device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 600, 700, 800, 900, 1000, 1100, 1200, and 1300 may be substituted for or combined with one or more operations of the methods 600, 700, 800, 900, 1000, 1100, 1200, and 1300.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by one or more processors of a first computing device for allocating network resources, comprising:
   determining one or more capabilities of each of a second computing device and a third computing device related to a computing task in which the second computing device and the third computing device are participating;
   determining a highest common performance threshold based on one or more capabilities of the second computing device, one or more capabilities of the third computing device, and the computing task;
   determining, based on the one or more capabilities of the second computing device, the one or more capabilities of the third computing device, the computing task, and the highest common performance threshold, a first allocation of network resources for the second computing device and a second allocation of network resources for the third computing device, wherein the first allocation of network resources and the second allocation of network resources are different and provide the second computing device and the third computing device with network resources to participate in the computing task; and
   allocating network resources to the second computing device according to the first allocation of network resources and to the third computing device according to the second allocation of network resources.

2. The method of claim 1, further comprising:
   determining a lowest common performance threshold based on the one or more capabilities of the second computing device, the one or more capabilities of the third computing device, and the computing task; and
   determining, based on the lowest common performance threshold, the first allocation of network resources for the second computing device and the second allocation of network resources for the third computing device.

3. The method of claim 1, further comprising allocating Edge computing device resources, to perform at least a part of the computing task, to one of the second computing device and the third computing device.

4. The method of claim 1, further comprising sending, to each of the second computing device and the third computing device, a respective output instruction associated with the computing task.

5. The method of claim 1, further comprising allocating, to the second computing device, a first communication link, and allocating, to the third computing device, a second communication link.

6. The method of claim 1, further comprising allocating network resources to a communication link between two Edge networks to provide, to the second computing device, a first communication link, and to provide, to the third computing device, a second communication link.

7. The method of claim 1, further comprising:
   receiving, from a fourth computing device, one or more capabilities of the fourth computing device related to the computing task in which the second computing device, the third computing device, and the fourth computing device are participating; and
   not allocating, to the fourth computing device, network resources based on the one or more capabilities of the fourth computing device and the computing task.

8. The method of claim 1, further comprising determining, based on the one or more capabilities of the second computing device, the one or more capabilities of the third computing device, and computing task, and the highest common performance threshold, that each of the second computing device and the third computing device requires a different allocation of network resources to participate in the computing task.

9. A first computing device, comprising:
   one or more processors implemented in circuitry and configured to cause the first computing device to:
   determine one or more capabilities of each of a second computing device and a third computing device related to a computing task in which the second computing device and the third computing device are participating;
   determine a highest common performance threshold based on one or more capabilities of the second computing device, one or more capabilities of the third computing device, and the computing task;
   determine, based on the one or more capabilities of the second computing device, the one or more capabilities of the third computing device, the computing task, and the highest common performance threshold, a first allocation of network resources for the second computing device and a second allocation of network resources for the third computing device, wherein the first allocation of network resources and the second allocation of network resources are different and provide the second computing device and the third computing device with network resources to participate in the computing task; and
   allocate network resources to the second computing device according to the first allocation of network resources and to the third computing device according to the second allocation of network resources.

10. The first computing device of claim 9, wherein the one or more processors are further configured to cause the first computing device to:
    determine a lowest common performance threshold based on the one or more capabilities of the second computing device, the one or more capabilities of the third computing device, and the computing task; and
    determine, based on the lowest common performance threshold, the first allocation of network resources for the second computing device and the second allocation of network resources for the third computing device.

11. The first computing device of claim 9, wherein the one or more processors are further configured to cause the first computing device to allocate Edge computing device resources, to perform at least a part of the computing task, to one of the second computing device and the third computing device.

12. The first computing device of claim 9, wherein the one or more processors are further configured to send, to each of the second computing device and the third computing device, a respective output instruction associated with the computing task.

13. The first computing device of claim 9, wherein the one or more processors are further configured to cause the first computing device to allocate, to the second computing device, a first communication link, and allocating, to the third computing device, a second communication link.

14. The first computing device of claim 9, wherein the one or more processors are further configured to cause the first computing device to allocate resources to a communication link between two Edge networks to provide, to the second computing device, a first communication link, and to provide, to the third computing device, a second communication link.

15. The first computing device of claim 9, wherein the one or more processors are further configured to cause the first computing device to:
   receive, from a fourth computing device, one or more capabilities of the fourth computing device related to the computing task in which the second computing device, the third computing device, and the fourth computing device are participating; and
   not allocate, to the fourth computing device, network resources based on the one or more capabilities of the fourth computing device and the computing task.

16. The first computing device of claim 9, wherein the one or more processors are further configured to cause the first computing device to determine, based on the one or more capabilities of the second computing device, the one or more capabilities of the third computing device, the computing task, and the highest common performance threshold, that each of the second computing device and the third computing device requires a different allocation of network resources to participate in the computing task.

17. One or more non-transitory, processor readable media having stored thereon processor-executable instructions that, when executed by one or more processors of a computing device, cause the computing device to:
   determine one or more capabilities of each of a second computing device and a third computing device related to a computing task in which the second computing device and the third computing device are participating;
   determine a highest common performance threshold based on one or more capabilities of the second computing device, one or more capabilities of the third computing device, and the computing task;
   determine, based on the one or more capabilities of the second computing device, the one or more capabilities of the third computing device, the computing task, and the highest common performance threshold, a first allocation of network resources for the second computing device and a second allocation of network resources for the third computing device, wherein the first allocation of network resources and the second allocation of network resources are different and provide the second computing device and the third computing device with network resources to participate in the computing task; and
   allocate network resources to the second computing device according to the first allocation of network resources and to the third computing device according to the second allocation of network resources.

18. The one or more non-transitory, processor-readable media of claim 17, wherein the stored processor-executable instructions that, when executed by the one or more processors of the computing device, further cause the computing device to:
   determine a lowest common performance threshold based on the one or more capabilities of the second computing device, the one or more capabilities of the third computing device, and the computing task; and
   determine, based on the lowest common performance threshold, the first allocation of network resources for the second computing device and the second allocation of network resources for the third computing device.

19. The one or more non-transitory, processor-readable media of claim 17, wherein the stored processor-executable instructions that, when executed by the one or more processors of the computing device, further cause the computing device to allocate Edge computing device resources, to perform at least a part of the computing task, to one of the second computing device and the third computing device.

20. The one or more non-transitory, processor-readable media of claim 17, wherein the stored processor-executable instructions that, when executed by the one or more processors of the computing device, further cause the computing device to send, to each of the second computing device and the third computing device, a respective output instruction associated with the computing task.

21. The one or more non-transitory, processor-readable media of claim 17, wherein the stored processor-executable instructions that, when executed by the one or more processors of the computing device, further cause the computing device to allocate, to the second computing device, a first communication link, and allocating, to the third computing device, a second communication link.

22. The one or more non-transitory, processor-readable media of claim 17, wherein the stored processor-executable instructions that, when executed by the one or more processors of the computing device, further cause the computing device to allocate resources to a communication link between two Edge networks to provide, to the second computing device, a first communication link, and to provide, to the third computing device, a second communication link.

23. The one or more non-transitory, processor-readable media of claim 17, wherein the stored processor-executable instructions that, when executed by the one or more processors of the computing device, further cause the computing device to:
   receive, from a fourth computing device, one or more capabilities of the fourth computing device related to the computing task in which the second computing device, the third computing device, and the fourth computing device are participating; and
   not allocate, to the fourth computing device, network resources based on the one or more capabilities of the fourth computing device and the computing task.

24. The one or more non-transitory, processor-readable media of claim 17, wherein the stored processor-executable instructions that, when executed by the one or more processors of the computing device, further cause the computing device to determine, based on the one or more capabilities of the second computing device, the one or more capabilities of the third computing device, and the computing task, and the highest common performance threshold, that each of the second computing device and the third computing device requires a different allocation of network resources to participate in the computing task.

25. A computing device, comprising:
   means for determining one or more capabilities of each of a second computing device and a third computing device related to a computing task in which the second computing device and the third computing device are participating;
   means for determining a highest common performance threshold based on one or more capabilities of the second computing device, one or more capabilities of the third computing device, and the computing task;
   means for determining, based on the one or more capabilities of the second computing device, the one or more capabilities of the third computing device, the computing task, and the highest common performance threshold, a first allocation of network resources for the second computing device and a second allocation of network resources for the third computing device, wherein the first allocation of network resources and the second allocation of network resources are different and provide the second computing device and the third computing device with network resources to participate in the computing task; and means for allocating network resources to the second computing device according to the first allocation of network resources and to the third computing device according to the second allocation of network resources.

26. The computing device of claim 25, further comprising means for determining, based on the one or more capabilities of the second computing device, the one or more capabilities of the third computing device, and the computing task, and the highest common performance threshold, that each of the second computing device and the third computing device requires a different allocation of network resources to participate in the computing task.

* * * * *